3,276,952
5-PHENYLHYDANTOALDEHYDE, DIETHYL-ACETAL AS A FUNGICIDE

Raymond W. Luckenbaugh, Wilmington, Del., assignor to E. I. du Pont de Nemours and Company, Wilmington, Del., a corporation of Delaware
No Drawing. Filed Feb. 24, 1964, Ser. No. 347,022
3 Claims. (Cl. 167—30)

This invention relates to the use of 5-phenylhydantoaldehyde, diethylacetal.

More specifically, it refers to a method for controlling soil fungi by applying to soil a fungicidal amount of 5-phenylhydantoaldehyde, diethylacetal.

Most 5-arylhydantoaldehydes, dialkylacetals known in the art have herbicidal properties. This property would preclude their use as fungicides.

However, I have discovered that the compound of this class possesses outstanding soil fungicidal activity and exhibits no apparent phytotoxicity to crop plants, fruit trees and ornamentals when applied to the soil in normal commercial fungicidal dosages.

Unlike other known dialkylacetals of 5-arylhydantoaldehydes the compound used in this invention is not phytotoxic at fungicidal rates for in-the-row or broadcast soil treatments. Additionally, the compound which I use in this invention is toxic to fungi at low rates, will protect crop plants from fungi throughout the growing season and have no residual effect which will tamper with the ecology of the surrounding area.

The soil fungicidal compound used in my invention is structurally defined as follows:

(I) 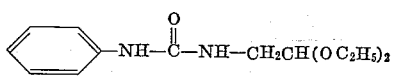

The compound of this invention is particularly effective in controlling the damping off fungi belonging to the genus Pythium. Other soil fungi controlled include Rhizoctonia spp., Fusarium spp., Phytophthora spp., Thielaviopsis spp. and Verticillium spp.

5-phenylhydantoaldehyde, diethylacetal is prepared by the method of Fritsch, Ber. 26, 427 (1893), by the reaction of phenylisocyanate with aminoacetaldehyde, diethylacetal.

COMPOSITIONS

Fungicidal compositions of this invention can comprise the active compound used in this invention and one or more surface-active agents.

The surface-active agents or surfactant can include any of the anionic, cationic and non-ionic surface-active agents. Suitable surface-active agents are set out, for example, in Searle U.S. Patent 2,426,417; Todd U.S. Patent 2,655,447; Jones U.S. Patent 2,412,510; or Lenher U.S. Patent 2,139,276. A detailed list of such agents is set forth in "Detergents and Emulsifiers—Annual" 1963 by John W. McCutcheon, Inc., and Bulletin E–607 of the Bureau of Entomology and Plant Quarantine of the U.S. Department of Agriculture.

Among the more preferred surfactants are those anionic and non-ionic agents recognized in the art as wetting agents, detergents or emulsifiers. Among the anionic surfactants, preferred ones are alkali metal or amine salts of alkylbenzenesulfonic acids such as dodecylbenzenesulfonic acid, fatty alcohol sulfates such as sodium lauryl sulfate, alkyl naphthalene sulfonates, sodium N-methyl-N-oleoyltaurate, fatty acid esters of sodium isethionate, dioctyl sodium sulfosuccinate and sodium dodecyldiphenyl oxide disulfonate. Among the non-ionic compounds, the preferred members are alkylphenoxy poly-(ethyleneoxy)ethanols such as nonylphenol adducts with ethylene oxide; trimethylnonyl polyethylene glycol ethers, polyethylene oxide adducts to fatty and rosin acids, long chain alkyl or mercaptan adducts with ethylene oxide, ethylene oxide adducts to esters of sorbitol with fatty acids, and ethylene oxide propylene oxide condensates.

Most preferred anionic surfactants, because of the improved ease of dissemination for the active ingredient, are salts of alkyl naphthalene or alkyl benzene sulfonic acid.

Most preferred non-ionic surfactants, because of improved ease of dissemination for the active ingredient, are ethylene oxide adducts to alkylphenol, to long chain alkyl alcohols containing eight through fourteen carbon atoms, to long chain alkyl mercaptans containing eight through fourteen carbon atoms or to sorbitan fatty acid esters.

Surfactants can be present in compositions in this invention in the range of 0.1 to 20% by weight. However, a range of 0.2 to 10% by weight is preferred.

Low strength compositions containing 1 to 5% by weight of the compound of Formula I can contain with or without surfactant present, common liquid solvents such as alcohols, ketones, chlorinated hydrocarbons, Cellosolves, aliphatic and aromatic hydrocarbons and N,N-dialkyl amides.

Suitable liquid solvents include xylene, alkylated naphthalene, cyclohexane, cyclohexanone, chloroethanes, isophorone and dimethyl formamide. Solvents having low phytotoxicity can also be used. Among these are white oils, isoparaffins and other hydrocarbons having a low sulfonatable residue.

Low strength compositions containing one or more of the above-mentioned solvents can be used for direct application to the soil.

Additionally, the active compound used in this invention can be formulated into more concentrated emulsifiable solutions containing 10 to 50% by weight of active, plus solvent and emulsifiers to make up 100%. The solvents can be water insoluble. Typical of the solvents used are higher ketones, higher aliphatic and aromatic hydrocarbons, chlorinated hydrocarbons and the like.

Preferred in the less concentrated solutions are solvents of low phytotoxicity such as the lower viscosity white mineral oils and the isoparaffins such as the "Soltrols."

Additional compositions can be formulated by adding a free-flowing inert power to the active agent.

Free-flowing inert powders can be any of the extenders commonly employed in the fungicide art. They can include inert finely divided diluents such as natural clays including attapulgite or kaolinite, diatomaceous earth, pyrophyllite, talc, synthetic mineral fillers derived from silica and silicates such as synthetic fine silica and synthetic calcium or magnesium silicate, carbonates, phosphates, and sulfates, sulfur, lime and flours such as wood, walnut shell, redwood, soybeans and cottonseed. For improved stability, diluents containing active acidic sites, such as attapulgite, should be inactivated with minor amounts of additives such as urea and hexamethylenetetramine.

Dust compositions contain 1 to 30% by weight of the active ingredient. However, 3 to 15% by weight is preferred.

Particle size of the extender can vary considerably but will ordinarily be somewhat under 50 microns in the finished formulation. Ureas and other fertilizers can be added to dust formulations to bring the concentration of active ingredient present down to 0.5 to 5% by weight of the total formulation.

The 5-phenylhydantoaldehyde, diethylacetal can be combined with diluents, carriers and adjuvants so as to form granules having a particle size of 8 to 60 mesh. Since the active compound used in this invention is an oil at elevated temperature, granules employing these compounds can be prepared by spraying the heated active compound or a solution of the active compound over the surface of preformed clay granules or expanded vermiculite. Alternatively, the compound can be mixed with finely divided clays and the mixture then granulated. Granules can contain 0.1 to 10% by weight of an ethylene oxide adduct to alkyl phenols. In these compositions, the active compound will ordinarily be present at the rate of 1 to 25% by weight. However, 3 to 15% by weight is preferred.

To prepare pellets, the active ingredient and diluent are combined with sufficient liquid to permit extrusion of strands which can be cut and then dried or can be dried and then granulated. Surfactants can be included in this formulation up to about 20% by weight. It is preferred that such pelleted compositions contain 10 to 40% by weight of active compound.

In wettable powder compositions containing the active ingredient, one or more surfactants and an adsorbent solid diluent, the active compound ordinarily will be present in a concentration in the range of 15 to 85% by weight. It is preferred to have 15 to 60% by weight of active compound. Surfactants will be present in a range from 0.1 to 10% by weight to obtain adequate wetting and dispersion in water. Preferred surfactants are salts of alkyl benzene or naphthalene sulfonic acids. Surface deactivators, such as urea or hexamethylenetetramine can be present in the range of 0 to 5% by weight. The remainder of the composition contains a solid absorbent diluent as described above. Preferred diluents are kaolinite, attapulgite or synthetic fine silica.

Wettable powders are prepared by mixing the ingredients in a blender and grinding the mixture in a hammer mill, air-impact mill or the like until the particle size has been reduced to make spray application practical and easy. These wettable powders can also be blended with additional diluents, such as talcs, to form the above-mentioned dust mixtures for direct dry application.

Compositions of this invention can contain soil insecticides such as chlordane, DDT, dieldrin, endrin, aldrin, methoxychlor, and others for simultaneous control of insects and fungi in the soil. From 0.1 to 10 parts by weight of the insecticide is used for each one part by weight of 5-phenylhydantoaldehyde, diethylacetal.

Compositions of this invention can contain other fungicides in order to control a broader spectrum of fungi. Illustrative of some of these fungicides are:

p-dimethylaminobenzenediazo sodium sulfonate;
quinone oxyaminobenzooxohydrazone;
tetraalkyl thiuramsulfides such as tetramethyl thiuram monosulfide or disulfide and tetraethyl thiuram monosulfide or disulfide;
metal salts of ethylene bisdithiocarbamic acid, e.g. manganese, zinc, iron and sodium salts;
pentachloronitrobenzene;
dodecylguanidine acetate;
N-trichloromethylthio tetrahydrophthalimide (Captan);
phenylmercury acetate;
2,4-dichloro-6-(o-chloroanilino)-s-triazine;
N-methylmercury p-toluenesulfonanilide;
chlorophenol mercuri hydroxides;
nitrophenol mercuri hydroxides;
ethyl mercury acetate;
ethyl mercury 2,3-dihydroxypropyl mercaptide;
methyl mercury acetate;
methyl mercury 2,3-dihydroxypropyl mercaptide;
1,4-dichloro-2,5-dimethoxybenzene;
3,3'-ethylenebis(tetrahydro-4,6-dimethyl - 2H - 1,3,5-thiadiazine-2-thione);
methyl mercury dicyandiamide;
N-ethyl mercury-p-toluenesulfonanilide;
metal (e.g. iron, sodium and zinc), ammonium and amine salts of dialkyldithiocarbamic acids;
tetrachloronitroanisole;
hexachlorobenzene;
methyl mercury nitrile;
tetrachloroquinone; and
N-trichloromethylthiophthalimide.

These additional fungicides will be present in the range of one-tenth to ten parts by weight for each one part by weight of 5-phenylhydantoaldehyde, diethylacetal.

Wettable powder formulations containing an insecticide and 5-phenylhydantoaldehyde, diethylacetal are prepared by blending with a diluent and a surfactant and then grinding in a hammer mill or air-impact mill to obtain intimately blended finely divided particles. This type formulation can be dispersed in water and sprayed in broadcast treatments followed by rotovation into the soil or sprayed in the furrow.

Dust compositions containing an insecticide and 5-phenylhydantoaldehyde, diethylacetal can be prepared by blending with a diluent and grinding in a hammer mill. These dust compositions can be applied to the soil in conventional dusting equipment in broadcast treatments, in-the-row treatments or as a hopper-box treatment as part of a seeding operation.

Insecticides and nematocides can also be combined with 5-phenylhydantoaldehyde, diethylacetal in emulsifiable compositions by dissolving the insecticide or nematocide and 5-phenylhydantoaldehyde, diethylacetal in an inert solvent containing an emulsifier. These compositions are emulsified in water and applied to the soil much like the wettable powder above.

In addition compositions can contain special additives such as corrosion inhibitors, pigments, antifoam agents and the like.

APPLICATION

The compound used in this invention can be sprayed or injected on or into the soil. Soil applications are applied at or before planting, as a side dressing to living plants, in the furrow, as a hopper-box treatment or as a soil drench. The dosage is from one-third of an ounce to 200 pounds of active ingredient per acre treated depending on method of application and soil type.

Good results are obtained by an in-the-row treatment. Treatment is directed on a band approximately two to four inches wide in such a way as to strike the sides of the furrow as well as the bottom of the furrow. The seed can then be planted and the furrow closed. The seeds, seedlings and growing plants are protected from attack by soil fungi. Alternatively, the compound used in this invention can be injected into a closed furrow containing the seed. One-quarter to ten pounds of active ingredients per 12,000 feet of a two-inch wide row gives satisfactory control of fungi.

A preferred dosage in the row because of exceptionally good control of fungi at low cost is one-half to three pounds of active ingredient per 12,000 feet of a two-inch wide row. Obviously, if the band width treated is more or less than two inches the dosage rate is adjusted accordingly. In-the-row treatment is extremely useful in protecting seeds, newly-germinated seedlings and growing plants of corn, tomatoes, watermelon, squash, carrots, lettuce, cantaloupe, peppers, cucumbers, beans, cotton, tobacco, ornamentals and the like from attack by fungi.

Soil drench treatments protect seeds, seedlings, and plants from the ravages of soil fungi by application of the compound used in this invention at rates of about 20 to 100 pounds of active ingredient per acre.

The 5-phenylhydantoaldehyde, the diethylacetal can be used in either water suspensions or oil solutions for the fungicidal treatment of organic materials such as wood, textile, fabrics, paints, leather, cordage, paper and insulating materials. The active compound can be used also as an emulsifiable concentrate and diluted with water to an active ingredient concentration of 0.1 to 10% by weight. This formulation is employed as a dip for treating paper and insulating materials rendering them resistant to attack by fungi. In a similar fashion, the active compound is dissolved in a low cost solvent such as Stoddard solvent, xylene, kerosene and the like to yield solutions with active ingredient concentrations ranging from 0.1 to 10%. This formulation is employed for industrial fungicidal purposes such as:

(a) dips for leather, cordage, fabrics and textiles and
(b) dips and pressure treatments for wood products including window frames, ties and telephone poles.

The active ingredient can be formulated into the standard paint formulations to yield mixtures containing 0.1 to 10% by weight of the active compound.

In order that this invention can be better understood the following additional examples are provided. It should be understood that all percentages given are by weight unless otherwise specified.

*Example 1*

| | Percent |
|---|---|
| 5-phenylhydantoaldehyde, diethylacetal | 40.00 |
| Dry synthetic calcium silicate ("Micro-Cel" 805) | 30.00 |
| Kaolinite | 28.00 |
| Alkylarylsulfonate | 1.75 |
| Methylcellulose | 0.25 |

The active compound is formulated into a wettable powder of the above composition by combining the dry components, blending in a ribbon blender, micro-pulverizing in a hammer mill until substantially all the product is below 50 microns in particle size and reblending the product in a ribbon blender.

This wettable powder is mixed with water and injected into soil infested with the black shank fungus *Phytophthora parasitica* var. *nicotinae*. The rate used is thirty pounds per acre of active ingredient. Tobacco seedlings planted in the treated soil are protected from attack by this fungus, resulting in a healthy crop of tobacco. Tobacco plants planted in untreated soil grow poorly resulting in less yield than from tobacco grown in treated soil.

*Example 2*

| | Percent |
|---|---|
| 5-phenylhydantoaldehyde, diethylacetal | 60.0 |
| Synthetic fine silica | 37.5 |
| Sodium dioctyl sulfosuccinate | 0.5 |
| Sodium lignosulfonate | 2.0 |

The above ingredients are blended and ground in a hammer mill to obtain a homogeneous mixture in which substantially all of the particles are 50 microns or less.

This wettable powder is mixed with water and is injected into soil infested with the black root rot fungus *Thielaviopsis basicola*. The rate used is thirty pounds per acre of active ingredient. Tobacco seedlings planted in the treated soil are protected from attack by the fungus, resulting in a healthy crop of tobacco. Tobacco plants planted in untreated soil grow poorly resulting in less yield than from tobacco grown in treated soil.

*Example 3*

| | Percent |
|---|---|
| 5-phenylhydantoaldehyde, diethylacetal | 25 |
| Alkylated naphthalene hydrocarbon | 70 |
| Mixed polyoxyethylene ethers and oil soluble sulfonates | 5 |

The active ingredients and the emulsifier are added to the hydrocarbon in an agitated vessel which is provided with a steam jacket to make gentle heating possible. Heat and agitation are supplied until a homogeneous mixture is obtained which can be emulsified readily in water for spray application.

This formulation is emulsified in water and sprayed in an open furrow at one pound per acre of active ingredient. Bean seeds are planted in the treated furrow at the same time as the treatment is made and the furrow closed. The bean seeds germinate and the seedlings and growing plants are protected from attack by the fungus *Rhizoctonia solani* resulting in a healthy stand and good crop of beans. Bean seeds planted in untreated soil are essentially destroyed and the few plants that remain are severely diseased and produce a poor crop.

*Example 4*

The following product is prepared by blending the ingredients as listed below and then passing the mixture through a deagglomerator such as an Entoleter mill to obtain a finely divided dust in which the soil fungicides and soil insecticides are uniformly distributed throughout.

| | Percent |
|---|---|
| Wettable powder of Example 2 | 16.8 |
| Dieldrin 50% W.P. | 6.0 |
| Micaceous talc | 77.2 |

This mixture which contains 10% 5-phenylhydantoaldehyde, diethylacetal and 3% active dieldrin is useful as a hopper-box treatment for seeds such as cotton. For application ten pounds of this dust is mixed with a hundred weight of machine-delinted cotton seed for hopper box application at planting time. After planting these protected seeds germinate and the cotton seedlings and growing plants are protected from soil fungi such as *Pythium* spp. resulting in a healthy stand of cotton which produces an excellent yield of cotton per acre. Seeds not treated as above frequently do not germinate and those that do result in seedlings which are later attacked by the above fungus and various insects resulting in a poor crop of cotton.

*Example 5*

| | Percent |
|---|---|
| 5-phenylhydantoaldehyde, diethylacetal | 5 |
| Hexamethylenetetramine | 1 |
| Attapulgite clay | 15 |
| Pyrophyllite | 79 |

The active ingredient is blended with the hexamethylenetetramine and attapulgite and ground in a hammer mill to obtain a concentrate which is then diluted into the finished dust by blending with the pyrophyllite followed by deagglomeration to obtain a uniform mixture.

This formulation is rotovated into soil infested with soil fungi such as *Pythium* spp. and *Fusarium oxysporum* f. *lycopersici*. The rate used is thirty pounds per acre of active ingredient. Tomato plants planted in the treated soil are protected from attack by these soil fungi resulting healthy plants and excellent yields of tomatoes. Tomato plants planted in untreated soil frequently damp off and those that survive have a high incidence of wilt resulting in poor plants.

*Example 6*

| | Percent |
|---|---|
| 5-phenylhydantoaldehyde, diethylacetal | 25 |
| Anhydrous sodium sulfate | 10 |
| Non-gelling kaolin clay | 65 |

The active compound is formulated into the above pellet herbicidal composition by intimately mixing the ingredients with a small amount of water in a ribbon blender and extruding the resulting paste under high pressure through a 1/16 inch diameter die, cutting the extruded "worms" into 1/8 inch lengths, and drying the mix.

This formulation is rotovated into soil infested with soil fungi such as *Pythium* spp. The rate used depending on soil type is from fifteen to sixty pounds per acre of active ingredient. Cucumber seeds are planted and subsequently grow and produce an acceptable crop. Cucumber seeds planted in untreated soil frequently do not germinate and those that do are generally diseased resulting in reduced yields.

The invention claimed is:
1. A method for controlling soil fungi comprising applying to fungi infested soil a fungicidal amount of 5-phenylhydantoaldehyde, diethylacetal.
2. A method for controlling soil fungi comprising applying to said fungi a fungicidal amount of 5-phenylhydantoaldehyde, diethylacetal.
3. A fungicidal composition comprising 0.1 to 20% by weight of a surface-active agent selected from the group consisting of ethylene oxide adducts to alkylphenol, long chain alkyl alcohol containing 8 through 14 carbon atoms, long chain alkyl mercaptan containing 8 through 14 carbon atoms and sorbitan fatty acid ester and a fungicidal amount of 5-phenylhydantoaldehyde, diethylacetal.

References Cited by the Examiner
UNITED STATES PATENTS
3,148,211   9/1964   Luckenbaugh _____ 260—553

JULIAN S. LEVITT, *Primary Examiner.*
VERA C. CLARKE, *Assistant Examiner.*